March 25, 1930.  E. H. HERBIG  1,751,631
AIRCRAFT
Filed June 23, 1928   3 Sheets-Sheet 1
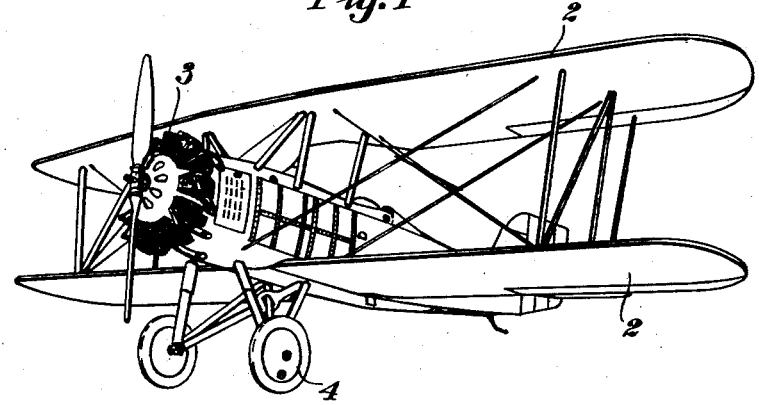
INVENTOR
Elwood H Herbig
BY Eyre Scott Keel
ATTORNEYS March 25, 1930.  E. H. HERBIG  1,751,631
AIRCRAFT
Filed June 23, 1928   3 Sheets-Sheet 2
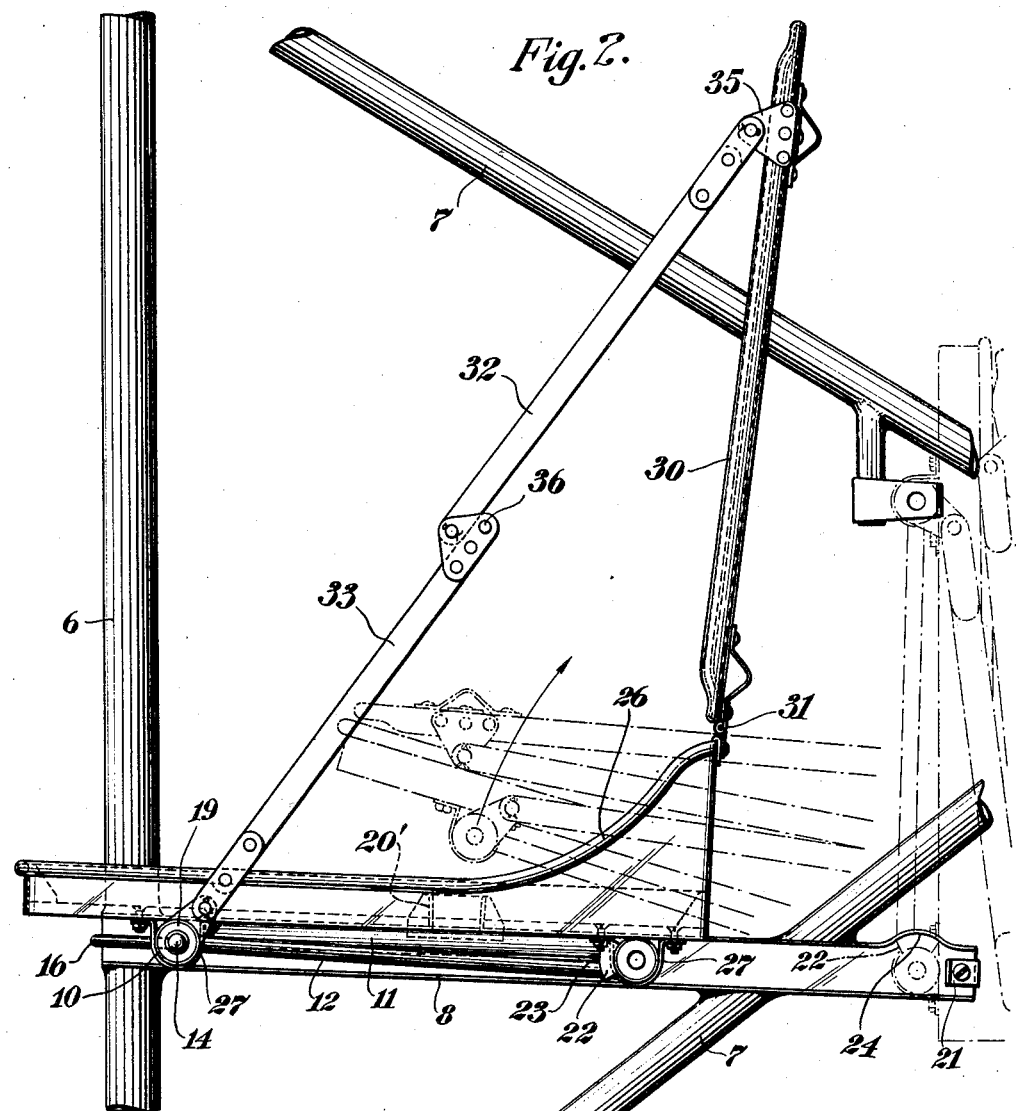
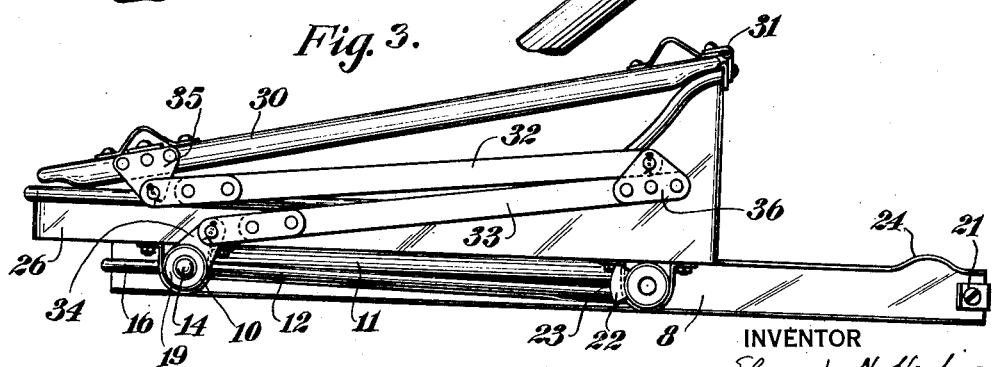
INVENTOR
Elwood H Herbig
BY Ezra Scott Keel
ATTORNEY March 25, 1930. E. H. HERBIG 1,751,631
AIRCRAFT
Filed June 23, 1928  3 Sheets-Sheet 3

INVENTOR
Elwood H. Herbig
BY
Eyre Scott & Keel
ATTORNEY

Patented Mar. 25, 1930

1,751,631

UNITED STATES PATENT OFFICE

ELWOOD H. HERBIG, OF GREAT NECK, NEW YORK, ASSIGNOR TO CHANCE M. VOUGHT, OF GRENWOLDE, GREAT NECK, NEW YORK

AIRCRAFT

Application filed June 23, 1928. Serial No. 287,860.

This invention relates to aircraft.

The object of the invention is a body or fuselage construction for aircraft including a novel construction and arrangement of seats or chairs therefor and more particularly a combined body and chair construction and arrangement permitting the collapse of the seat structure and/or the ready removal thereof to an unobstructing position leaving the cockpit free and unimpeded when the use of the seat or chair is not desired. A further object of the invention is a seat construction and mount of a particularly simple and light weight character.

A further object of the invention is a combined body and seat construction permitting the ready adjustment thereof in a particularly simple and satisfactory manner.

For a better understanding of the invention, reference may be had to the accompanying drawings forming a part of this application, wherein—

Fig. 1 is a three-quarter front view of an aeroplane embodying my invention,

Fig. 2 is a skeleton view of a part of the body embodying a seat and mount construction according to my invention, Fig. 3 is a view similar to Fig. 2 indicating the partial collapse of the chair.

Figure 4:
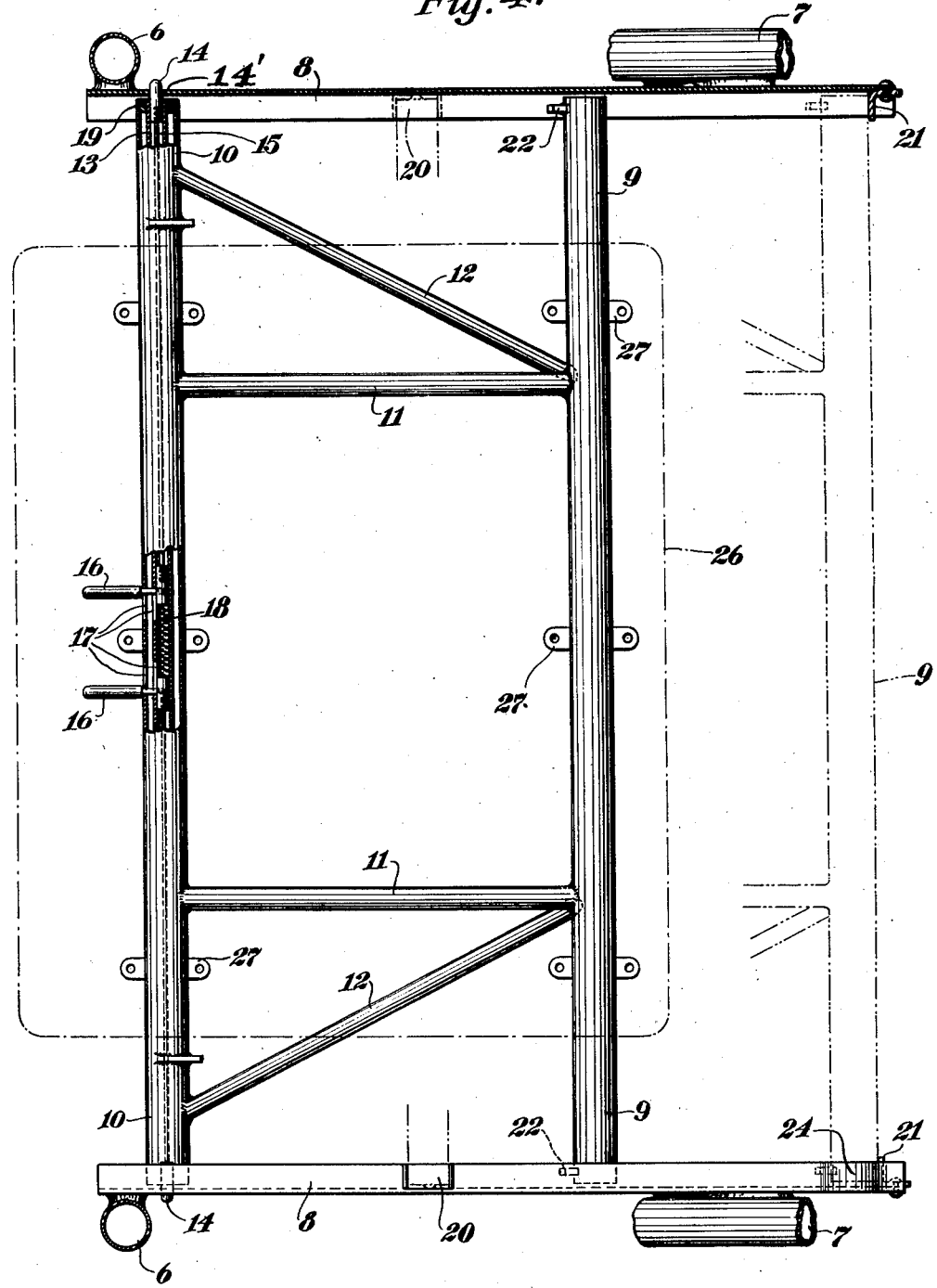
Fig. 4 is another view of the construction of Figs. 2 and 3 looking down upon the same with parts removed for convenience.

Referring to the drawings and particularly to Figs. 2, 3 and 4, I have indicated a body frame construction including vertical tubular structural members 6 and diagonal or inclined members 7, these structural members enclosing or defining a cockpit or personnel compartment. Rigidly connected with these frame members 6 and 7 in any suitable manner, as for example by welding, are the elongated members 8 of U-section, these members 8 having their legs or the grooves defined thereby turned towards each other and being disposed, in the particular embodiment shown, substantially horizontal. These members 8 serve as run or guide-ways for the main supporting cross-wise frame members 9 and 10 for the seat, these cross members 9 and 10 being rigidly connected together by the transverse members 11 and the inclined members 12. The chair frame members 9 and 10 are substantially parallelly arranged, as indicated, and have their ends disposed in the run-ways formed by the U-sectioned members 8, the frame structure 9, 10, 11, 12 forming a sliding carriage for the seat and the member 9 also forming a pivot therefor as hereinafter described. The members 9 and 10 are tubular shaped and the member 10 is provided with a concentrically arranged tube 13 therein. Within this tube 13 are reposed the slidable locking pins 14 which pass through openings 14' in the members 8 for locking the chair carriage in the forward position indicated in Fig. 4. The locking pins 14 are carried on the ends of elongated rods 15 which extend inwardly toward each other and carry at their inner ends the hand actuating handles 16, the latter projecting out through registering slots 17 formed in the tubes 10 and 13. By actuating the handles 16 the pins 14 may be withdrawn from their registering holes in the runway members 8 for unlocking the carriage frame, and I have indicated suitable spring devices 18 for yieldingly pressing the pins 14 and their carrying rods 15 into locking engagement with the runways. The concentric tube 13 may be spaced from and carried within the outer tube 15 in any suitable manner, as for example by the annular spacing devices 19. By unlocking the pins 14 the seat carriage frame 9—10 may be moved backwardly to the dotted position indicated in Fig. 4 and in this position the whole carriage may be swung up about the carriage member 9 as a pivotal axis, diametrically opposite openings 20 being provided in the upper parts of the run-way members 8 to provide for the exit from the runways of the front carriage member 10, the ends of the latter, together with the locking pins 14, passing freely out these openings 20 in the hindmost position of the carriage frame member 9. Stops 21 in the form of angle-pieces are attached to the rear ends of the run-way members 8 to limit the rearward sliding movement of the carriage frame. The carriage frame member 9 is also provided with forwardly extending lugs 22, these lugs 22 having a depth substantially the diameter of the ends of the member 9 and therefore assisting and facilitating the forward and rearward guiding movements of the carriage frame member 9. These members 22 are sector-shaped and are provided with arcuate outer surfaces 23, and the upper parts of the run-way members 8 at their rearward ends are provided with arcuate offsets 24 for accommodating these arcuate-shaped sector members 22 when the carriage frame is swung upwardly about the rear carriage frame member 9, as a pivot. The sector members 22 also serve to retain the seat structure firmly in the ends of the run-way members when removed to inoperative position.

The seat 26 may be mounted on the carriage frame 9—10 in any suitable manner as for example by means of the straps 27. The seat 26 is provided with a back rest member 30 and the latter is collapsible to permit the backward sliding and upward pivoting movements of the carriage frame. It is pivoted or hinged to the rear part of the seat by means of the hinges 31 and the upper part of this back rest 30 is collapsibly connected with the front carriage frame member 10. For this purpose the seat is provided on each side with a pair of link connections 32 and 33, each link connection 33 being pivotally connected at its lower end to a rigid lug or bell crank lever 34 carried by the carriage frame member 10. The link 32 is pivotally connected to a bracket 35 secured to the back rest 30 near the upper edge thereof and is pivotally connected to the upper end of the lower link 33 by means of the bracket 36 which is rigidly carried by the link 30. In the distended position, as shown in Fig. 2, the two link members 32 and 33 form a substantially rigid support for the back rest and, if desired, for rigid locking, the arrangement may be such as to have the pivotal connection between the links 32 and 33 pass slightly beyond the dead center with the upper end of the link 33 engaging the underside of the member 32 above the pivot point. The collapsed position of the back rest 30 is indicated in Fig. 3, the back collapsing forwardly upon the seat 26 in preparation for the backward movement of the seat carriage 9—10. As above indicated, the carriage frame 9—10 together with the seat or chair, may be slid backwardly to the rearmost end of the run-ways 8 and there pivoted upwardly about the member 9 as a pivotal axis, the ends of the front carriage frame member 10 effecting an exit from the run-ways through the openings 20 and vertical guides 20' carried by the run-ways thereat. Fig. 2 indicates in dot and dash lines the chair carriage and the chair removed to the rear side of the cockpit, the lugs 22—23 assisting in retaining the chair and its mount within the run-way during the pivoting movement and in the collapsed and folded-away position.

I have illustrated my invention as embodied in the fuselage 1 of an aeroplane including lifting wings 2, power plant 3 and landing gear 4, but it is understood that it is applicable to aircraft generally.

I claim:

1. In an aeroplane the combination of a body frame and a movable seat mount structure carried thereby including a pair of guideways and a seat frame having frame members spaced longitudinally of the guideways and supported and guided by said guideways for rectilinear movement, with means whereby the seat frame pivots as a unit about certain of the longitudinally spaced frame members as an axis with the other spaced frame members disengaged from the guides.

2. A structure of the character set forth in claim 1 including a back rest which is collapsible with reference to the seat independently of the rectilinear and pivoting movements of the seat structure.

3. In a craft of the character set forth a body frame, a pair of run-ways supported thereby, a rigid seat carriage frame having parts spaced longitudinally of the guideways for rectilinear movement in said run-ways, and means whereby said carriage frame may in at least one position thereof in the runways be pivoted about certain parts of said carriage frame as an axis with the other longitudinally spaced parts of the frame disengaged from the guideways.

4. In an aircraft a body frame, a pair of run-ways facing each other, a seat carriage including a pair of frame members whose ends are disposed in the run-ways, said runways being provided with exit openings in one position of the carriage, permitting one of the carriage frame members to be removed from the run-ways and the carriage pivoted as a whole about the other frame member.

5. An aircraft of the character set forth in claim 4 wherein the pivotal carriage member is provided with lugs traversing the runways.

6. An aircraft of the character set forth in claim 4 wherein the pivotal member of the carriage frame is provided with an arcuate lug and the runway is provided with a corresponding arcuate recess for the reception of said lug when the carriage is pivoted about the pivotal member thereof.

7. In a craft of the character set forth a body frame, a pair of run-way members having guide grooves facing each other, a rigid chair carriage frame having frame members spaced longitudinally of the run-way members and slidable from one position to another of the body along said grooves and means whereby the carriage may be pivoted about one of said longitudinally spaced frame members as an axis while disposed in the grooves with the other spaced members disengaged from the grooves.

8. In a structure of the character set forth in claim 7 wherein one of the spaced frame members is provided with a spring pressed lock engaging a co-operating part of one of the run-ways together with means for disengaging the lock at will.

9. An aircraft of the character set forth in claim 3 including means for locking the chair carriage in the operative position.

10. An aircraft of the character set forth in claim 3 including a collapsible back rest which may be collapsed against the seat and the frame when the seat and its carriage are pivoted about the pivotal axis.

11. In an aircraft a main body having a cockpit therein, a pair of horizontally disposed run-ways having guide grooves facing each other disposed in said cockpit, a chair carriage including a pair of spaced transverse members with their ends disposed in said grooves, said run-ways being provided intermediate their ends with diametrically opposite openings on their upper sides to permit the exit and entry of one of said transverse carriage members, and said carriage frame being capable of pivoting about the other carriage member within the grooves when the other carriage frame member registers with said openings.

12. In an aircraft of the character set forth in claim 11 including a collapsible back rest which is collapsible in the forward direction upon the seat and carriage, the back rest and the seat and carriage being pivotal as a unit about the pivoting carriage member when the other member registers with the openings in the run-way.

13. An aircraft of the character set forth in claim 12 wherein the pivotal carriage member is provided with arcuate lugs disposed in the run-ways and the run-ways at their rear ends are provided with corresponding raised arcuate guiding surfaces for receiving said arcuate lugs.

14. An aircraft of the character set forth in claim 13 wherein a seat is firmly secured upon the slidable carriage and a collapsible back rest is attached at its bottom to said seat and through link connections at its top with one of the sliding carriage members.

15. An aircraft of the character set forth in claim 14 wherein a seat is firmly secured upon the slidable carriage and a collapsible back rest is attached at its bottom to said seat and through a link connection at its top with one of the sliding carriage members, and also including spring pressed locking pins disposed in one of the carriage frame members and adapted to enter recesses in the run-way members, together with spring actuated hand controlled devices for releasing the same.

In testimony whereof, I have signed my name to this specification.

ELWOOD H. HERBIG.

CERTIFICATE OF CORRECTION.

Patent No. 1,751,631.  Granted March 25, 1930, to

ELWOOD H. HERBIG.

It is hereby certified that error appears in the printed specification of the above numbered patent requiring correction as follows: Page 3, lines 51, 58 and 64, claims 13, 14 and 15, the numerals "12, 13 and 14" in each claim respectively should read "11"; and that the said Letters Patent should be read with these corrections therein that the same may conform to the record of the case in the Patent Office.

Signed and sealed this 22nd day of April, A. D. 1930.

(Seal)

M. J. Moore,
Acting Commissioner of Patents.